US011967911B2

(12) United States Patent
Ziaieinejad et al.

(10) Patent No.: US 11,967,911 B2
(45) Date of Patent: *Apr. 23, 2024

(54) METHOD FOR DIRECT VOLTAGE SATURATION CALCULATION AND PREVENTION OF INVERTER VOLTAGE SATURATION

(71) Applicant: Karma Automotive LLC, Irvine, CA (US)

(72) Inventors: Saleh Ziaieinejad, Irvine, CA (US); Geng Niu, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,399

(22) Filed: May 19, 2023

(65) Prior Publication Data
US 2023/0361708 A1 Nov. 9, 2023

Related U.S. Application Data

(63) Continuation of application No. 16/560,657, filed on Sep. 4, 2019, now Pat. No. 11,689,134.
(Continued)

(51) Int. Cl.
H02P 23/00 (2016.01)
B60L 15/20 (2006.01)
H02P 27/08 (2006.01)

(52) U.S. Cl.
CPC .......... H02P 23/0077 (2013.01); B60L 15/20 (2013.01); H02P 27/085 (2013.01); B60Y 2200/91 (2013.01)

(58) Field of Classification Search
CPC .... H02P 23/0077; H02P 27/085; B60L 15/20; B60Y 2200/91
(Continued)

(56) References Cited

U.S. PATENT DOCUMENTS 5,355,299 A 10/1994 Carpita
7,586,286 B2 9/2009 Cheng et al.
(Continued)

OTHER PUBLICATIONS

USPTO. Office Action relating to U.S. Appl. No. 16/560,657, dated Nov. 22, 2022.

Primary Examiner — Kawing Chan
(74) Attorney, Agent, or Firm — Honigman LLP

(57) ABSTRACT

A voltage saturation prevention algorithm used as at least part of a method of controlling an electric vehicle, wherein the electric vehicle comprises an electric motor, a controller, and an inverter. The controller receives a control signal with an instruction to operate the electric motor, then sends a switching signal corresponding to the control signal to the inverter, wherein the inverter provides a plurality of output signals for operation of the electric motor. The method includes determining the expected amplitude of the plurality of output signals based on the instruction to operate the electric motor, calculating the amount of modification of the plurality of output signals required to prevent the expected amplitude from reaching a saturation value, and modifying, based on the calculation, the instruction to operate the electric motor to prevent the expected amplitude from reaching the saturation value. The method is implemented in software, without any additional hardware.

20 Claims, 4 Drawing Sheets

Related U.S. Application Data

(60) Provisional application No. 62/833,733, filed on Apr. 14, 2019.

(58) Field of Classification Search
USPC .................................................... 318/400.17
See application file for complete search history.

(56) References Cited

U.S. PATENT DOCUMENTS

| | | |
|---|---|---|
| 2002/0043953 A1 | 4/2002 | Masaki et al. |
| 2005/0075766 A1 | 4/2005 | Kobayashi et al. |
| 2008/0116842 A1* | 5/2008 | Cheng .................... H02P 21/22 |
| | | 318/807 |
| 2010/0140003 A1* | 6/2010 | Saha ...................... B60L 15/08 |
| | | 318/432 |
| 2012/0306423 A1* | 12/2012 | Si ....................... H02P 21/0089 |
| | | 318/521 |
| 2013/0113556 A1 | 5/2013 | Ortiz et al. |
| 2015/0381083 A1 | 12/2015 | Barrass |

* cited by examiner

100

METHOD FOR DIRECT VOLTAGE SATURATION CALCULATION AND PREVENTION OF INVERTER VOLTAGE SATURATION

CROSS REFERENCE TO PRIOR APPLICATIONS

This U.S. patent application is a continuation of, and claims priority under 35 U.S.C. § 120 from, U.S. patent application Ser. No. 16/560,657, filed on Sep. 4, 2019, which claims priority under 35 U.S.C. § 119(e) to U.S. Provisional Patent Application No. 62/833,733, filed on Apr. 14, 2019. The disclosures of these prior applications is considered part of the disclosure of this application and are hereby incorporated by reference in their entireties.

TECHNICAL FIELD

The present disclosure relates to a voltage saturation prevention algorithm.

BACKGROUND

Electric motors are a main part of the powertrain of electric vehicles. These motors are controlled by power inverters that have limited input and output voltage. One of the main problems of inverter operation at high speeds is voltage saturation, a condition where the requested voltage from the inverter is beyond the inverter's possible deliverable voltage. In this condition, the drive system becomes oscillatory and even unstable in severe transient cases.

Prior arts have utilized different approaches to overcome the problem of voltage saturation in inverters. In one approach, voltage derating (setting the allowable voltage maximum to a point below the absolute voltage maximum) is applied on the calibration tables of motor control software. However, this approach by definition prevents the inverter from providing its rated maximum capability. In other cases, online voltage saturation algorithms are employed. However, the previously proposed methods have a complex structure and are computationally expensive.

SUMMARY

To overcome these shortcomings, this document presents a novel voltage saturation prevention method for permanent magnet (PM) motor drives. In one embodiment, the method directly calculates the amount of modification in current commands of the inverter to provide maximum voltage capability of the inverter and simultaneously prevents the inverter from voltage saturation. In one embodiment, the method is based on current angle modification. In one embodiment, the method also addresses possible errors in calibration tables caused by look-up table interpolations. In one embodiment, to implement this method, a mathematical analysis may be performed first to study the behavior of voltage components of the inverter at high-speed operation.

Disclosed herein is a voltage saturation prevention algorithm used as at least part of a method of controlling an electric vehicle, wherein the electric vehicle comprises an electric motor, a controller, and an inverter. In one embodiment, the controller receives a control signal with an instruction to operate the electric motor. In one embodiment, the inverter receives a switching signal corresponding to the control signal from the controller, the inverter providing a plurality of output signals for operation of the electric motor.

In one embodiment, the method includes determining the expected amplitude of the plurality of control signals based on the instruction to operate the electric motor. In one embodiment, the method includes calculating the amount of modification of the plurality of control signals required to prevent the expected amplitude of the output signals from reaching a saturation value. In one embodiment, the method includes modifying, based on the calculation, the instruction to operate the electric motor to prevent the expected amplitude from reaching the saturation value. In one embodiment, the method is implemented in software.

In another embodiment, the instruction is an instruction for the inverter to operate at a specific command current value. In another embodiment, the specific command current value has a plurality of current components.

In another embodiment, the plurality of output signals is a plurality of voltage components.

In another embodiment, calculating is based on current angle modification. In another embodiment, a modification in current angle results in reduction of voltage amplitude. In another disclosed embodiment, the amount of modification in current angle (and consequently in current components) is calculated from a detailed mathematical analysis.

In another embodiment, the method automatically corrects the errors in a calibration table of the electric motor. By using the proposed voltage saturation prevention algorithm, the calibration tables of motor control software may be defined based on maximum capability of the inverter (without considering conservative deratings), and the proposed algorithm may protect the inverter from oscillatory operation beyond its linear range.

According to one embodiment, the proposed algorithm has a simple structure and directly calculates the amount of modification in current components from the amount of voltage saturation. In another embodiment, the proposed approach automatically corrects the errors in calibration tables of the motor while allowing the motor to operate up to its maximum capability. In another embodiment, the simple structure of the proposed algorithm eases its implementation and computational load on the inverter-motor system's microprocessor.

In another disclosed embodiment, the voltage saturation prevention algorithm is based on observations from a mathematical analysis of voltage components in an electric motor drive system. In another embodiment, based on the proposed mathematical analysis, when the q-axis voltage component is positive, an increase in current angle reduces the voltage amplitude and may overcome the problem of voltage saturation. In addition, in one embodiment, when the q-axis voltage component is negative, for the active high-voltage operating range of the inverter, an increase in absolute current angle still may reduce the impact or occurrence of the voltage saturation problem. In another disclosed embodiment, the amount of modification in current angle (and consequently in current components) is calculated from a detailed mathematical analysis. In one embodiment, by using the proposed voltage saturation prevention algorithm, the calibration tables of motor control software may be defined based on maximum capability of the inverter (without considering conservative deratings), and the proposed algorithm may protect the inverter from oscillatory operation beyond its linear range.

Other aspects, features, and techniques will be apparent to one skilled in the relevant art in view of the following detailed description of the embodiments.

DESCRIPTION OF DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a voltage saturation prevention algorithm used as at least part of a method of controlling an electric vehicle.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative algorithms described herein may be combined in a single implementation, but the application is not limited to the specific exemplary combinations of voltage saturation prevention algorithms that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
FIG. 1 is a perspective view depicting an exemplary embodiment of an electric vehicle that may include an electric motor drive system.
Figure 1:
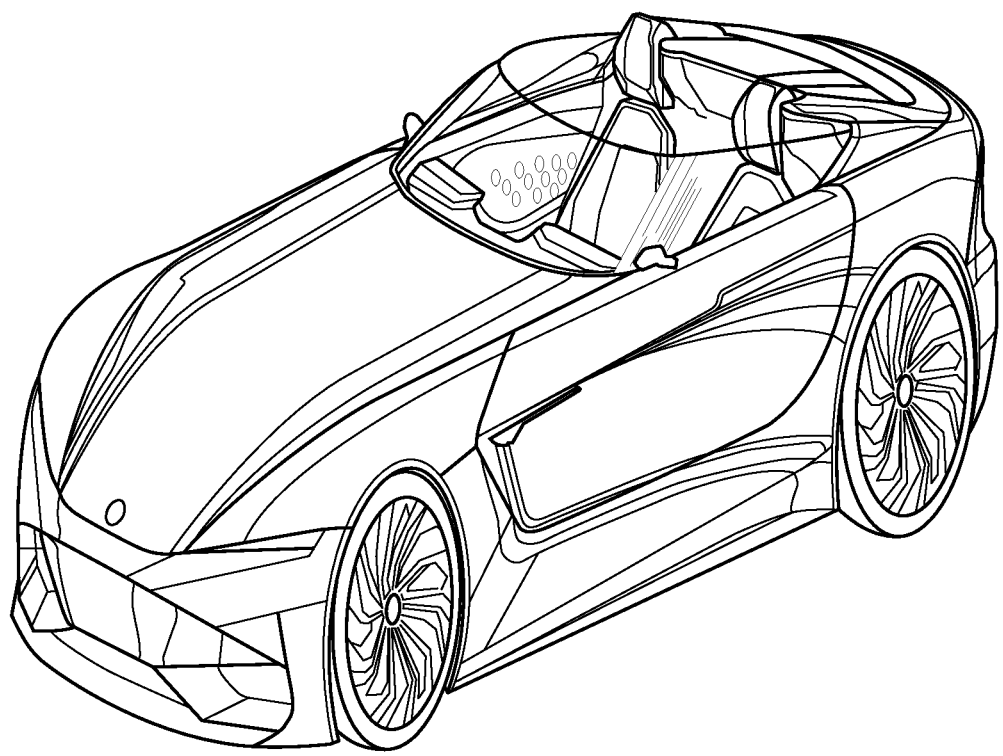

FIG. 1 is a perspective view depicting an exemplary embodiment of an electric vehicle 100 that may include an electric motor drive system 200. The electric vehicle 100 shown in FIG. 1 is exemplary. The electric motor drive system 200 may be installed in any vehicle with use for an electric motor drive system, including but not limited to hybrid vehicles.

Figure 2:
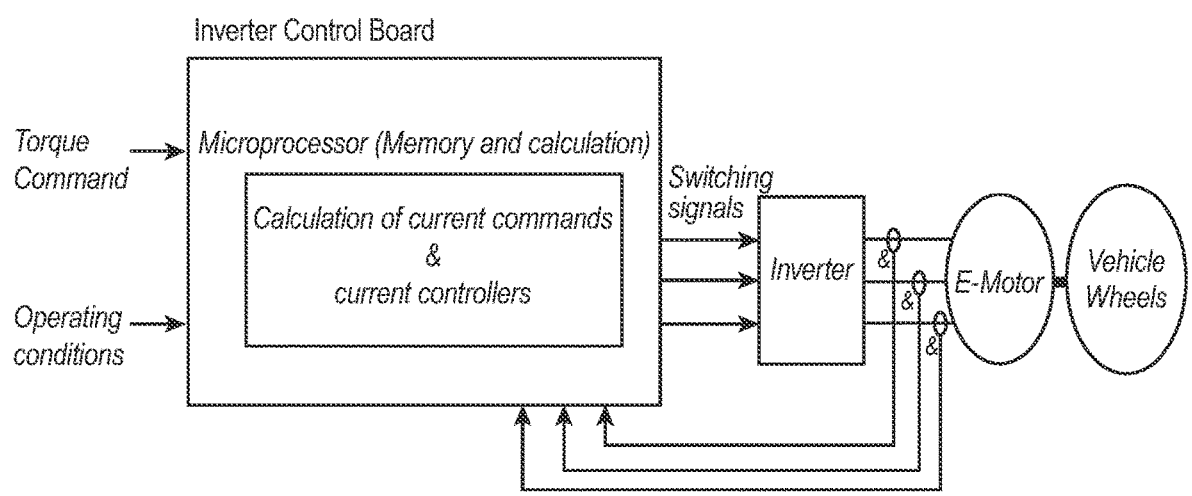
FIG. 2 is a flow diagram depicting the structure of an exemplary electric motor drive system in electric vehicles.

FIG. 2 is a flow diagram depicting the structure of an exemplary electric motor drive system 200 in electric vehicles. The algorithm depicted in FIG. 4 may be installed as part of the inverter control board 210, which in one embodiment is designed to control the inverter 220 at its commanded value with a good dynamic and steady-state response. In one embodiment, the inverter 220 feeds power to the electric motor 230, which in turn applies torque to a plurality of vehicle wheels 240.

In one embodiment, the inverter control board 210 receives a control signal with an instruction to operate the electric motor 230. In one embodiment, the control signal comprises a torque command. In one embodiment, the torque command may be an instruction for the electric motor 230 to operate with a specific torque value in order to achieve a desired velocity for the electric vehicle 100. The torque command may be determined based on input from systems including but not limited to an acceleration pedal of the electric vehicle 100, a brake pedal of the electric vehicle 100, and a cruise control system of the electric vehicle 100. In one embodiment, the inverter control board may receive further feedback regarding the operating conditions of the electric motor drive system 200 or other systems by means of an analog input or a resolver input.

In one embodiment, the inverter control board 210 performs a series of calculations using the received instruction in order to produce a switching signal for the inverter 220. The switching signal may be designed to use space vector pulse width modulation (SVPWM) to operate the legs of the inverter 220 to produce a plurality of output signals corresponding to the received instruction to operate the electric motor 230. In one embodiment, the plurality of output signals is a set of current components. In one embodiment, the plurality of output signals includes a first output signal and a second output signal, wherein the first output signal is a current component that is related to the direct axis as a flux component, and wherein the second output signal is a current component that is related to the quadrature axis as a torque component. In one embodiment, the plurality of output signals may be mapped to a dq frame of reference.

Figures 3A, 3B:
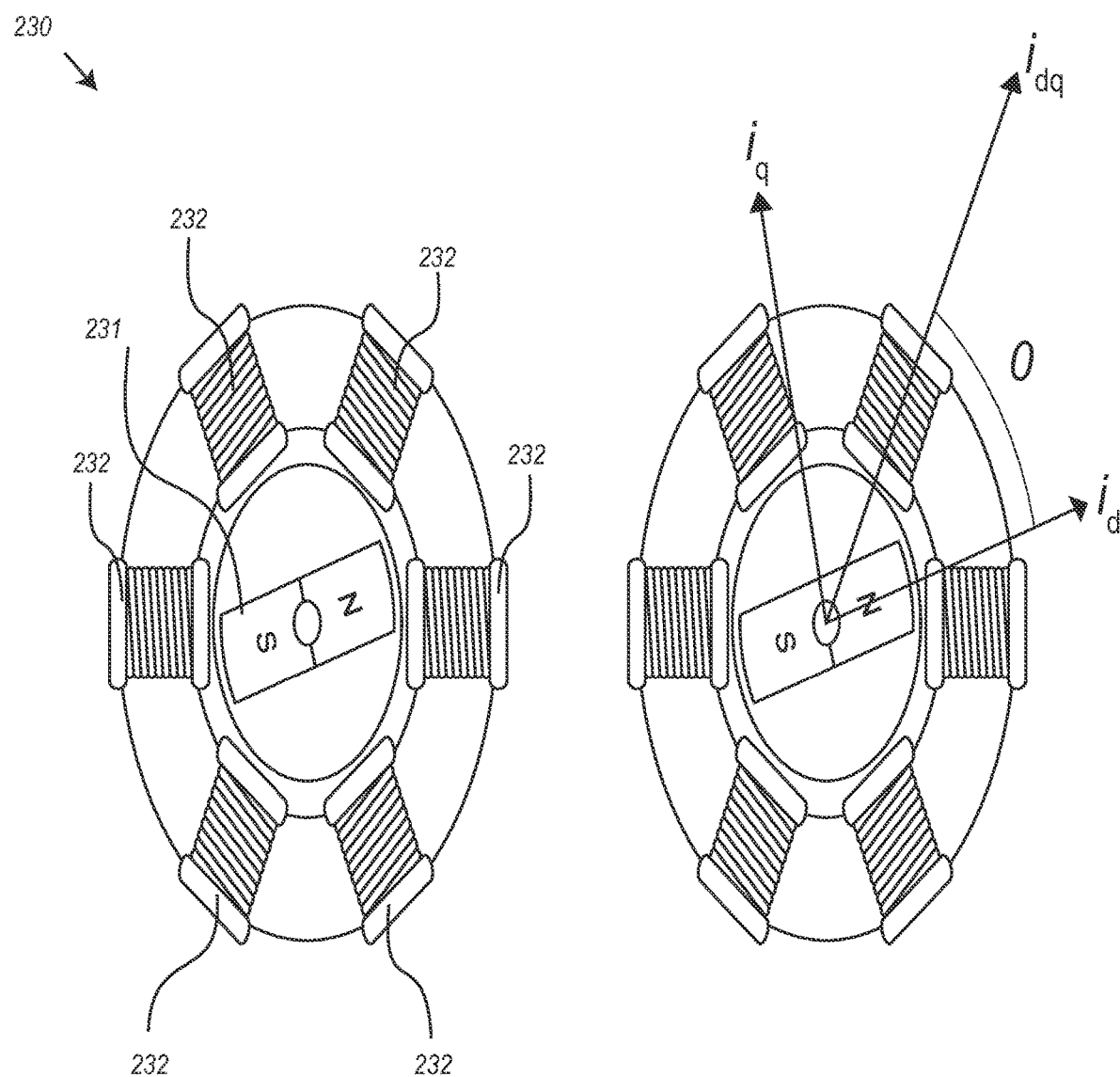
FIG. 3A is a side view depicting an exemplary embodiment of an electric motor for an electric vehicle.
FIG. 3B is a side view depicting an exemplary current vector coordinate system for the electric motor of FIG. 3A.

FIG. 3A is a side view depicting an exemplary embodiment of an electric motor 230 for an electric vehicle 100. In one embodiment, the electric motor 230 includes a rotor 231 and a stator with a plurality of stator coils 232. In one embodiment, the rotor 231 may include a permanent magnet. In one embodiment, the stator coils 232 may receive power from the inverter 220 to produce a magnetic field by means of SVPWM. In one embodiment, the electric motor drive system 200 rotates the magnetic field of the stator in order to induce rotation in the rotor 231 and propel the electric vehicle 100.

FIG. 3B is a side view depicting an exemplary current vector coordinate system for the electric motor 230 of FIG. 3A. In one embodiment, the electric motor 230 has a rotation angle value θ. Rotation angle θ may represent a current angle of the motor, wherein the current angle is the angle between the current vector $i_{dq}$ and the d-axis. In one embodiment, the current angle is defined as $$\theta = a\tan\left(\frac{i_q}{i_d}\right)$$

Figure 4:
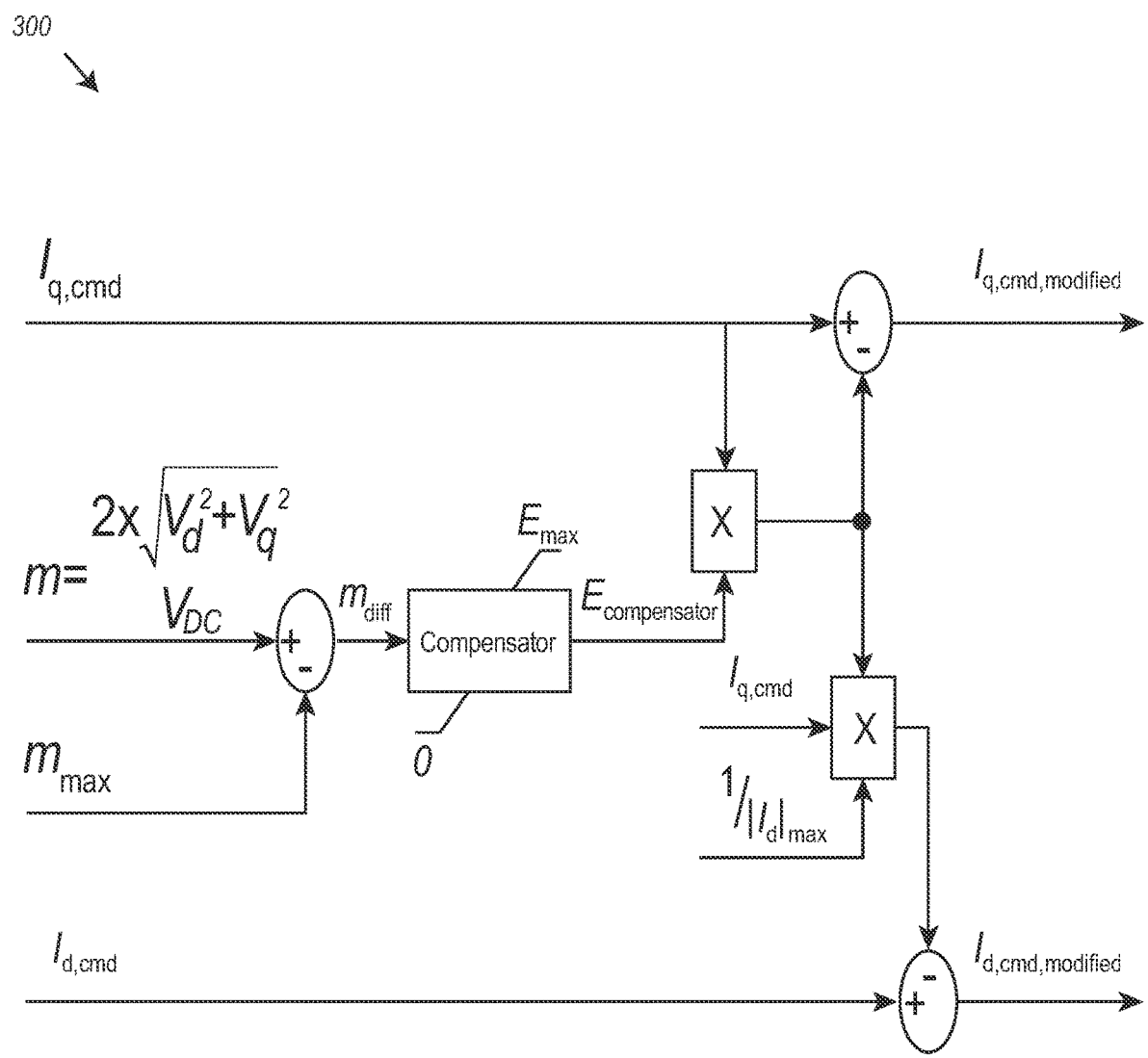
FIG. 4 is a signal block diagram depicting an exemplary embodiment of a voltage saturation prevention algorithm.

FIG. 4 is a signal block diagram depicting an exemplary embodiment of a voltage saturation prevention algorithm 300. According to one embodiment, the voltage saturation prevention algorithm 300 modifies the commanded current components comprising the output signal only when the voltage amplitude is saturated and exceeds a maximum allowable value.

In one embodiment, the modulation index m is defined as $$m = \frac{\sqrt{V_d^2 + V_q^2}}{V_{DC}}$$

and modulation index differential $m_{diff}$ may be expressed with the following equation:

$$m_{diff} = m - m_{max}$$

where $m_{max}$ is the maximum allowable modulation index value before the electric motor drive system 200 is considered to be experiencing voltage saturation. $m_{max}$ may vary according to a number of factors, including but not limited to the hardware architecture of the inverter and the PWM strategy.

In one embodiment, saturated voltage modifier $E_{compensator}$ is the result of feeding $m_{diff}$ through a compensator. The compensator may be a proportional (P) compensator, proportional-integral (PI) compensator, or any other compensator type chosen by the designer. In one embodiment, the compensator uses windup or non-windup limiters to limit $E_{compensator}$ to a minimum and maximum allowable value. In one embodiment, the minimum allowable value of $E_{compensator}$ is 0, representing a condition of no voltage saturation and normal electric motor operation. In one embodiment, the maximum allowable value of $E_{compensator}$ is $E_{max}$ (wherein $E_{max}$ is an application-specific design parameter), representing a condition of maximum voltage saturation adjustment.

In one embodiment, the modified quadrature current component $I_{q,cmd,modified}$ may be expressed with the following equation:

$$I_{q,cmd,modified} = I_{q,cmd} - I_{q,cmd} * E_{compensator}$$

wherein $I_{q,cmd}$ is the original current component before factoring in voltage saturation. The above equation may be reduced to the following equation:

$$I_{q,cmd,modified} = I_{q,cmd}(1 - E_{compensator})$$

In one embodiment, $E_{compensator}$ is equal to zero and $I_{q,cmd,modified}$ is equal to $I_{q,cmd}$. In this condition, the voltage saturation prevention algorithm 300 has determined that the electric motor drive system 200 is not experiencing voltage saturation and no current modification is necessary. In one embodiment, $E_{compensator}$ is not equal to zero and $I_{q,cmd,modified}$ has a magnitude equal to a fraction of the magnitude of $I_{q,cmd}$. In this condition, the voltage saturation prevention algorithm 300 has determined that the electric motor drive system 200 is experiencing voltage saturation and that a modification of current value is necessary to prevent that condition.

In one embodiment, the modified direct current component $I_{d,cmd,modified}$ may be expressed with the following equation:

$$I_{d,cmd,modified} = I_{d,cmd} - I_{q,cmd} * (I_{q,cmd} E_{compensator}) \frac{1}{|I_d|_{max}}$$

wherein $I_{d,cmd}$ is the original direct current command before factoring in voltage saturation and $|I_d|max$ is the maximum potential value of the direct current component that the electric motor drive system 200 may have. The above equation may be reduced to the following equation:

$$I_{d,cmd,modified} = I_{d,cmd} - \frac{I_{q,cmd}^2 E_{compensator}}{|I_d|_{max}}$$

In one embodiment, $E_{compensator}$ is equal to zero and $I_{d,cmd,modified}$ is equal to $I_{d,cmd}$. In this condition, the voltage saturation prevention algorithm 300 has determined that the electric motor drive system 200 is not experiencing voltage saturation and no current modification is necessary. In one embodiment, $E_{compensator}$ is not equal to zero and $I_{d,cmd,modified}$ has a magnitude greater than the magnitude of $I_{d,cmd}$. In this condition, the voltage saturation prevention algorithm 300 has determined that the electric motor drive system 200 is experiencing voltage saturation and that a modification of current value is necessary to prevent that condition.

In one embodiment, m is determined by the inverter control board 210 as a function of the current component values $I_{d,cmd}$ and $I_{q,cmd}$. In one embodiment, the ability to determine m without using measurement systems allows the voltage saturation prevention algorithm 300 to operate without adding any additional hardware to the electric motor drive system 200.

While this disclosure makes reference to exemplary embodiments, it will be understood by those skilled in the art that various changes in form and details may be made therein without departing from the scope of the claimed embodiments.

What is claimed is:

1. A computer-implemented method executed on data processing hardware of a vehicle that causes the data processing hardware to perform operations comprising:
  receiving a control signal comprising a specific command current value to operate the electric motor, the specific command current value comprising:
    a commanded quadratic current component value $I_{q,cmd}$; and
    a commanded direct current component value $I_{d,cmd}$, wherein a direct current component for the electric motor comprises a maximum potential value $|Id|max$;
  calculating a saturated voltage modifier value $E_{compensator}$ for preventing an expected amplitude of a plurality of output signals for an inverter from reaching a saturation value; and
  modifying the specific command current value to operate the vehicle by:
    determining a modified commanded quadratic current component value $I_{q,cmd,modified}$ by multiplying the commanded quadratic current component value $I_{q,cmd}$ by the saturated voltage modifier value $E_{compensator}$; and
    determining a modified direct current component value $I_{d,cmd,modified}$ by calculating:

$$Id, cmd - \frac{Iq, cmd^2 \times Ecompensator}{|Id|max}.$$

2. The method of claim 1, wherein the vehicle comprises an electric vehicle.

3. The method of claim 1, wherein the plurality of output signals is a plurality of voltage components.

4. The method of claim 1, wherein calculating the saturation voltage modifier value is based on a current angle modification.

5. The method of claim 4, wherein a modification in the current angle results in a reduction of amplitude of the plurality of output signals.

6. The method of claim 1, wherein the operations further comprise determining a modulation index based on the specific command current value.

7. The method of claim 6, wherein the modulation index is determined as a function of the specific command current value without using any measurement systems.

8. The method of claim 6, wherein calculating the saturation voltage modifier value is based on the modulation index.

9. The method of claim 1, wherein the operations further comprise automatically correcting errors in a calibration table of the electric motor based on the specific command current value.

10. The method of claim 1, wherein the calculated saturated voltage modifier value is limited to a maximum allowable value based on an application-specific design parameter.

11. A vehicle comprising:
- an electric motor;
- an inverter providing a plurality of output signals for operation of the electric motor; and
- a controller in communication with the inverter and performing operations comprising:
- receiving a control signal comprising a specific command current value to operate the electric motor, the specific command current value comprising:
  - a commanded quadratic current component value $I_{q,cmd}$; and
  - a commanded direct current component value $I_{d,cmad}$, wherein a direct current component for the electric motor comprises a maximum potential value $|Id|max$;
- calculating a saturated voltage modifier value $E_{compensator}$ for preventing an expected amplitude of a plurality of output signals for an inverter from reaching a saturation value; and
- modifying the specific command current value to operate the vehicle by:

determining a modified commanded quadratic current component value $I_{q,cmd,modified}$ by multiplying the commanded quadratic current component value $I_{q,cmd}$ by the saturated voltage modifier value $E_{compensator}$; and determining a modified direct current component value $I_{d,cmd,modified}$ by calculating:

$$Id, cmd - \frac{Iq, cmd^2 \times Ecompensator}{|Id|max}.$$

12. The vehicle of claim 11, wherein the vehicle comprises an electric vehicle.

13. The vehicle of claim 11, wherein the plurality of output signals is a plurality of voltage components.

14. The vehicle of claim 11, wherein calculating the saturation voltage modifier value is based on a current angle modification.

15. The vehicle of claim 14, wherein a modification in the current angle results in a reduction of amplitude of the plurality of output signals.

16. The vehicle of claim 11, wherein the operations further comprise determining a modulation index based on the specific command current value.

17. The vehicle of claim 16, wherein the modulation index is determined as a function of the specific command current value without using any measurement systems.

18. The vehicle of claim 16, wherein calculating the saturation voltage modifier value is based on the modulation index.

19. The vehicle of claim 11, wherein the operations further comprise automatically correcting errors in a calibration table of the electric motor based on the specific command current value.

20. The vehicle of claim 11, wherein the calculated saturated voltage modifier value is limited to a maximum allowable value based on an application-specific design parameter.

* * * * *